Patented Aug. 25, 1953

2,650,223

UNITED STATES PATENT OFFICE 2,650,223

2,5-DIKETOPIPERAZINES

Harold E. Zaugg, Howard Glenn, and Morris Freifelder, Waukegan, Ill., assignors to Abbott Laboratories, North Chicago, Ill., a corporation of Illinois No Drawing. Application August 8, 1950,
Serial No. 178,362

12 Claims. (Cl. 260—268)

This invention relates to new and useful chemical compounds, and includes among the objects and advantages novel chemical compounds which are valuable intermediates for pteridine type compounds, and processes for preparing the same.

In specific detail, the following examples will illustrate the invention.

EXAMPLE I

*3-carbethoxy-2,5-diketopiperazine*

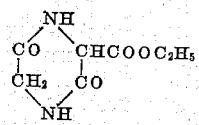

A solution of 18.3 gm. of diethyl carbobenzoxyglycylaminomalonate (Schneider, Biochem. Z, 291, 328 (1937)) in 200 cc. of absolute ethanol is hydrogenated at 70° C. and 30 pounds per square inch hydrogen pressure in the presence of 3 gm. of 5% palladium on charcoal. After the uptake of hydrogen is complete, the catalyst is removed by filtration, and the filtrate is concentrated in vacuo to a thick paste. The paste is dissolved in hot Skellysolve, filtered, and cooled to precipitate 3-carbethoxy-2,5-diketopiperazine. The product is a colorless crystalline powder, melting point 170–172° C.

EXAMPLE II

*3-carbamyl-2,5-diketopiperazine*

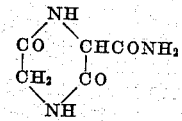

To a solution of 5 gm. of 3-carboxy-2,5-diketopiperazine (prepared per Example I) in 40 cc. of absolute ethanol is added enough saturated solution of dry ammonia in absolute ethanol to make a total volume of 110–120 cc. The resulting solution is kept at room temperature for about 6 hours, and then refrigerated for 16 hours to precipitate the product 3-carbamyl-2,5-diketopiperazine. The crystals are shiny white leaflets decomposing rapidly at 262–264° C., after turning brown at 240° C.

EXAMPLE III

*3-(N-pentamethylene)-carbamyl-2,5-diketopiperazine*

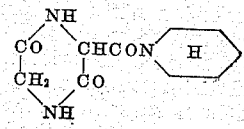

To a solution of about 5 gm. of 3-carbethoxy-2,5-diketopiperazine in 40 cc. of absolute ethanol is added 15 cc. of piperidine and enough absolute ethanol to make a volume of 110–120 cc. The solution is kept at room temperature for about 6 hours, and refrigerated for about 16 hours to precipitate the product. The 3-(N-pentamethylene)-carbamyl - 2,5 - diketopiperazine crystallizes to small shiny needles, with a melting point of 278–280° C. with decomposition.

EXAMPLE IV

*Diethyl carbethoxyglycylaminomalonate*

$C_2H_5OCONHCH_2CONHCH(COOC_2H_5)_2$

To about 10 gm. of carbethoxyglycine is added 10 gm. of thionyl chloride, and the reaction mixture is heated to 30–35° C. for 10 or 20 minutes. The mixture is heated to 60° C., and the excess thionyl chloride is removed in vacuo. The residual yellow-orange oil is dissolved in 70 cc. of dry ether. The ether solution is added portionwise to a cold solution of 29 gm. of ethylaminomalonate and 100 cc. of dry ether. After standing in an ice bath for half an hour the reaction mixture is filtered, and the filtrate is cooled overnight. The crystallized diethyl carbethoxyglycylaminomalonate is recovered by filtration and has a melting point of 98.5–99.5° C.

EXAMPLE V

*3-carbethoxy-2,5-diketo-3-ethylpiperazine*

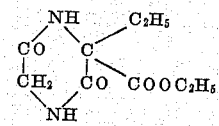

To a solution of about 0.9 gm. of sodium in 25 cc. of absolute ethanol and 12.2 gm. of diethyl carbobenzoxyglycylaminomalonate is added 10.4 gm. of ethyl iodide. The resulting mixture is refluxed for about 15 hours. At the end of the reflux period the reaction mass is cooled and poured onto about 100 gm. of ice. The viscous oily diethyl ethylcarbobenzoxyglycylaminomalonate which separates is dissolved in about 75 cc. of absolute ethanol and is shaken several hours with 2.5 gm. of Raney nickel. The mixture is filtered, and the filtrate is hydrogenated at about 70° C. and 30 pounds hydrogen pressure in the presence of 2 gm. of 5% palladium on carbon. The hydrogen absorption is completed in about 2 hours, but the shaking is continued for about 4 additional hours. The hydrogenated solution is filtered and concentrated under reduced pressure to give an oil which crystallizes on cooling.

The crystals are triturated with hot Skellysolve B, and on cooling the resulting solution the crystalline product is obtained as colorless granules, melting point 162–163.5° C.

EXAMPLE VI

*3-n-butyl-3-carbethoxy-2,5-diketopiperazine*

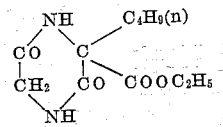

About 0.90 gm. of sodium in 25 cc. of absolute ethanol, 12.2 gm. of diethyl carbobenzoxyglycylaminomalonate and n-butyl iodide is refluxed for about 16 hours. At the end of the reflux period the reaction mixture is poured over 100 gm. of ice with stirring, and diethyl n-butylcarbobenzoxyglycylaminomalonate separates as a viscous oil.

A solution of about 11.2 gm. of diethyl n-butylcarbobenzoxyglycylaminomalonate in 100 cc. of absolute ethanol is shaken with about 2 gm. of Raney nickel for several hours. The mixture is filtered, and the filtrate is hydrogenated over 2 gm. of 5% palladium on carbon under 25 pounds per square inch of hydrogen pressure. When the reduction is complete, the solution is filtered and evaporated to dryness under reduced pressure. To the soft residue is added 25 cc. of dry ether and 200 cc. of Skellysolve B. Upon standing the residue becomes friable and is recovered by filtration. The product 3-n-butyl-3-carbethoxy-2,5-diketopiperazine is a colorless powder with a melting point of 166–170° C.

EXAMPLE VII

*3-carbethoxy-3-β-carbethoxyethyl-2,5-diketopiperazine*

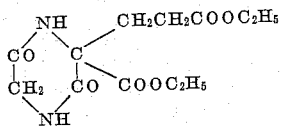

About a ⅛ inch cube of sodium is dissolved in 15 cc. of absolute ethanol and into this solution is suspended 3.72 gm. of 3-carbethoxy-2,5-diketopiperazine (per Example I). To the suspension is added in four portions, over a period of about 10 minutes, 2.1 gm. of freshly dissolved ethylacrylate. The reaction mixture is stirred at room temperature for about 2½ hours. The colorless solid which forms is recovered by filtration and recrystallized from methyl ethyl ketone. 3 - carbethoxy - 3-β-carbethoxyethyl-2,5-diketopiperazine is a crystalline product of colorless platelets having a melting point of 179.5–180.5° C.

EXAMPLE VIII

*6-benzyl-3-carbamyl-2,5-diketopiperazine*

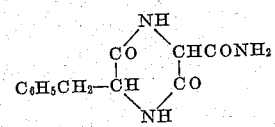

A solution of the acid chloride of 18.5 gm. of carbobenzoxy-dl-phenylalanine in 200 cc. of dry ether is prepared according to Bergman and Zervas, Ber., 65, 1192 (1932). The solution is cooled to 5° C. and the cold solution of 21.6 gm. of diethylaminomalonate in 100 cc. of dry ether is added thereto. After stirring and cooling for about an hour, the addition of about 200 cc. of cold water precipitates diethyl carbobenzoxy-dl-phenylalaninaminomalonate. 25 grams of the resultant malonate in 200 cc. of ethanol is hydrogenated at room temperature and 30 pounds per square inch hydrogen in the presence of 5 gm. of 5% palladium on carbon. 6-benzyl-3-carbethoxy-2,5-diketopiperazine is recovered by filtration, and evaporating the filtrate to dryness. Following the procedure of Example II, 6-benzyl-3-carbamyl-2,5-diketopiperazine is produced by ammonolysis. The product has a melting point of 202–203° C.

EXAMPLE IX

*3-carbethoxy-2,5-diketo-1-methylpiperazine*

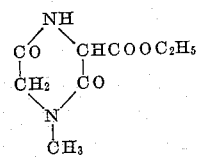

To a solution of about 8.9 gm. of sarcosine in 50 cc. of 2 N sodium hydroxide is added 17 gm. of benzyl chloroformate in 25 cc. of 4 N sodium hydroxide with vigorous stirring. The stirring is continued for about half an hour, and on settling, carbobenzoxysarcosine is obtained as a viscous oil.

To 81 gm. of the carbobenzoxysarcosine in 500 cc. of ether is added portionwise 77 gm. of phosphorous pentachloride, keeping the temperature of the reaction mixture below 7° C. After adding the phosphorous pentachloride the ether is removed under reduced pressure, leaving carbobenzoxysarcosyl chloride as a residual oil.

75 gm. of carbobenzoxysarcosyl chloride in 500 cc. of dry ether is added to 66 gm. of diethyl aminomalonate in 250 cc. of dry ether, keeping the reaction mixture below 10° C. 39 gm. of sodium carbonate in 400 cc. of cold water is added to the reaction mixture and the mass is stirred for about 2 hours on an ice bath. The mixture is filtered, and the recovered crystallized diethyl carbobenzoxysarcosylaminomalonate has a melting point of 75.5–77° C.

A solution of 35 gm. of diethyl carbobenzoxysarcosylaminomalonate in 250 cc. of absolute ethanol is hydrogenated at room temperature in 30 pounds per square inch pressure in the presence of 3.5 gm. of 5% palladium on charcoal. After completion of the reduction the catalyst is removed by filtration, and the filtrate is evaporated to dryness under reduced pressure. The viscous residue is recrystallized from ether, and the 3-carbethoxy-2,5-diketo-1-methylpiperazine thus obtained has a melting point of 93.5–94° C.

EXAMPLE X

*N,N'-dimethylsarcosylaminomalonamide hydrochloride*

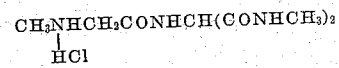

To a solution of about 250 gm. of dry methylamine in 750 gm. of absolute ethanol is added 32 gm. of diethyl chloroacetylaminomalonate. The solution is warmed slightly, and then allowed to stand at room temperature for about 2 weeks. The reaction mixture is clarified by filtration and concentrated to dryness in vacuo. The yellow glassy residue is triturated with isopropanol and the isopropanol is filtered to recover the undissolved solid product. Recrystalization from methanol gives the N,N'-dimethylsarcosylaminomalonamide hydrochloride as fine filamentous needles, melting point 229–230° C.

EXAMPLE XI

*2,5-diketo-1-methyl-3-(N-methylcarbamyl)-piperazine*

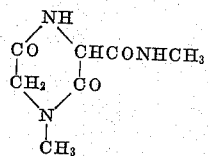

To about 170 cc. of a 25% solution of methylamine in dry, ice cold ether is added 5 gm. of finely powdered 3-carbethoxy-2,5-diketo-1-methylpiperazine (prepared according to Example IX). The piperazine dissolves very rapidly and precipitation of the product starts very shortly. The reaction mixture is stirred on an ice bath for about 4 hours, and the 2,5-diketo-1-methyl-3-(N-methylcarbamyl)-piperazine is recovered by filtration. Recrystallization from ethanol gives shiny needles, melting point 235–237° C. with sintering at 225° C.

Others may readily adapt the invention for use under various conditions of service, by employing one or more of the novel features disclosed or equivalents thereof. As at present advised with respect to the apparent scope of our invention, we desire to claim the following subject matter.

We claim:

1. A compound of the formula:

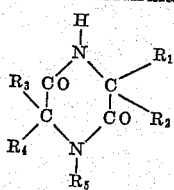

wherein $R_1$ is selected from the class consisting of hydrogen, lower alkyl, and lower alkylcarbalkoxy; $R_2$ is selected from the class consisting of lower carbalkoxy, lower carbamyl and substituted carbamyl; $R_3$ is selected from the class consisting of hydrogen, lower alkyl, monocyclic aralkyl, lower alkylcarbalkoxy; $R_4$ and $R_5$ are selected from the class consisting of hydrogen and lower alkyl.

2. A compound of the formula:

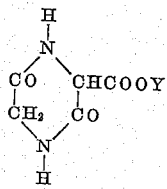

wherein Y is a lower alkyl group.

3. The compound 3-carbethoxy-2,5-diketopiperazine.

4. The compound 3-carbamyl-2,5-diketopiperazine.

5. The compound 3-(N-pentamethylene)-carbamyl-2,5-diketopiperazine.

6. The compound 3-carbethoxy-3-β-carbethoxyethyl-2,5-diketopiperazine.

7. The compound 3-carbethoxy-2,5-diketo-1-methylpiperazine.

8. The process which comprises hydrogenating diethyl carbobenzoxyglycylaminomalonate to form 3-carbethoxy-2,5-diketopiperazine.

9. The process which comprises reacting ammonia with 3-carbethoxy-2,5-diketopiperazine to produce 3-carbamyl-2,5-diketopiperazine.

10. The process which comprises reacting piperidine with 3-carbethoxy-2,5-diketopiperazine to form 3-(N-pentamethylene-carbamyl-2,5-diketopiperazine.

11. The process which comprises reacting 3-carbethoxy-2,5-diketopiperazine with ethylacrylate to form 3-carbethoxy-3-β-carbethoxyethyl-2,5-diketopiperazine.

12. The process which comprises hydrogenating diethyl carbobenzoxysarcosylaminomalonate to produce 3-carbethoxy-2,5-diketo-1-methylpiperazine.

HAROLD E. ZAUGG.
HOWARD GLENN.
MORRIS FREIFELDER.

References Cited in the file of this patent
Bergmann et al., Z. Physiol. Chem. 174 76–93 (1928).